(12) United States Patent
Cairns et al.

(10) Patent No.: US 10,894,915 B2
(45) Date of Patent: *Jan. 19, 2021

(54) TARGETING ENHANCED PRODUCTION THROUGH DEEP CARBONATE STIMULATION: STABILIZED ACID EMULSIONS CONTAINING INSOLUBLE SOLID MATERIALS WITH DESIRED WETTING PROPERTIES

(71) Applicants: Saudi Arabian Oil Company, Dhahran (SA); Cornell University, Ithaca, NY (US)

(72) Inventors: Amy J. Cairns, Houston, TX (US); Ghaithan A. Al-Muntasheri, Katy, TX (US); Mohammed Sayed, Houston, TX (US); Liling Fu, Ithaca, NY (US); Genggeng Qi, Ithaca, NY (US); Emmanuel P. Giannelis, Ithaca, NY (US)

(73) Assignees: SAUDI ARABIAN OIL COMPANY; CORNELL CENTER FOR TECHNOLOGY, ENTERPRISE & COMMERCIALIZATION

( * ) Notice: Subject to any disclaimer, the term of this patent is extended or adjusted under 35 U.S.C. 154(b) by 0 days.

This patent is subject to a terminal disclaimer.

(21) Appl. No.: 16/430,153

(22) Filed: Jun. 3, 2019

(65) Prior Publication Data

US 2019/0382650 A1    Dec. 19, 2019

Related U.S. Application Data

(63) Continuation of application No. 15/381,670, filed on Dec. 16, 2016, now Pat. No. 10,421,898.

(Continued)

(51) Int. Cl.
    *E21B 41/02*    (2006.01)
    *C09K 8/72*    (2006.01)
    (Continued)

(52) U.S. Cl.
    CPC .................. *C09K 8/72* (2013.01); *C09K 8/74* (2013.01); *C09K 8/82* (2013.01); *C09K 8/86* (2013.01);
    (Continued)

(58) Field of Classification Search
    CPC ........ C09K 8/72; C09K 8/74; C09K 2208/32; C09K 8/82; E21B 41/02; E21B 43/25
    See application file for complete search history.

(56) References Cited

U.S. PATENT DOCUMENTS

| 4,382,868 A | 5/1983 | House |
| 4,762,537 A | 8/1988 | Fleming et al. |

(Continued)

FOREIGN PATENT DOCUMENTS

| WO | WO2012051007 A2 | 4/2012 |
| WO | WO2014070454 A1 | 5/2014 |

(Continued)

OTHER PUBLICATIONS

Hull et al., "Recent Advances in Viscoelastic Surfactants for Improved Production From Hydrocarbon Reservoirs", SPE International Symposium on Oilfield Chemistry The Woodlands Texas USA, 2015, pp. 1340-1357, Society of Petroleum Engineers.

(Continued)

*Primary Examiner* — Silvana C Runyan
(74) *Attorney, Agent, or Firm* — Bracewell LLP; Constance R. Rhebergen

(57) ABSTRACT

A stabilized emulsified acid composition for deep carbonate formation stimulation is provided. The stabilized acid emulsion composition includes a petroleum operable to provide (Continued)

a barrier between an acid and a reservoir rock, the acid operable to react with the reservoir rock to dissolve the reservoir rock and produce a wormhole, a functional framework operable to stabilize the stabilized acid emulsion, an emulsifier operable to stabilize the stabilized acid emulsion, and a corrosion inhibitor operable to provide protection against corrosion for the metal components of a well. The petroleum can be diesel. The acid can be hydrochloric acid. The functional framework can be selected from the group comprising surface-modified clay-based material, zeolites, hybrid organic-inorganic materials, covalent-organic framework materials, and boron nitride nanotubes, and combinations thereof. The functional framework can be a surface-modified clay material selected from an organoclay. The corrosion inhibitor is a cationic ammonium-based corrosion inhibitor.

6 Claims, 11 Drawing Sheets

Related U.S. Application Data

(60) Provisional application No. 62/268,714, filed on Dec. 17, 2015.

(51) Int. Cl.
| | |
|---|---|
| C09K 8/74 | (2006.01) |
| C09K 8/82 | (2006.01) |
| C09K 8/86 | (2006.01) |
| E21B 43/25 | (2006.01) |

(52) U.S. Cl.
CPC .............. *E21B 41/02* (2013.01); *E21B 43/25* (2013.01); *C09K 2208/32* (2013.01)

(56) References Cited

U.S. PATENT DOCUMENTS

| | | | | |
|---|---|---|---|---|
| 6,036,765 | A * | 3/2000 | Farrow | ................. C04B 24/425 106/287.17 |
| 8,919,444 | B2 * | 12/2014 | Clay | ....................... E21B 43/11 102/306 |
| 9,038,722 | B2 * | 5/2015 | Patil | ....................... C09K 8/467 166/293 |
| 2011/0111989 | A1 | 5/2011 | Bustos et al. | |
| 2012/0090845 | A1 | 4/2012 | Huang et al. | |
| 2012/0128530 | A1 * | 5/2012 | Jenkins | ................. C07C 217/08 422/7 |
| 2012/0285690 | A1 | 11/2012 | Weaver et al. | |
| 2013/0045897 | A1 | 2/2013 | Chakraborty et al. | |
| 2013/0261031 | A1 | 10/2013 | Johnson | |
| 2013/0281329 | A1 | 10/2013 | De Wolf et al. | |
| 2014/0116695 | A1 | 5/2014 | Maghrabi et al. | |
| 2014/0116708 | A1 | 5/2014 | Wadekar et al. | |
| 2014/0305649 | A1 | 10/2014 | Tang et al. | |
| 2014/0349894 | A1 | 11/2014 | Quintero et al. | |
| 2014/0357537 | A1 | 12/2014 | Wadekar et al. | |
| 2015/0114646 | A1 | 4/2015 | Price Hoelscher et al. | |
| 2015/0144343 | A1 | 5/2015 | Mazyar et al. | |
| 2015/0148270 | A1 | 5/2015 | Hussein et al. | |
| 2015/0159071 | A1 | 6/2015 | Massey et al. | |
| 2015/0225640 | A1 | 8/2015 | Crews et al. | |
| 2015/0240147 | A1 | 8/2015 | Jiang et al. | |
| 2015/0368539 | A1 | 12/2015 | Tour et al. | |
| 2016/0017204 | A1 | 1/2016 | Hill et al. | |

FOREIGN PATENT DOCUMENTS

| | | |
|---|---|---|
| WO | WO2014116508 A1 | 7/2014 |
| WO | WO2015038117 A1 | 3/2015 |

OTHER PUBLICATIONS

International Search Report and Written Opinion for International Application No. PCT/US2016/067185; International Filing Date Dec. 16, 2016; dated Mar. 20, 2017: pp. 1-14.

Portier et al., "Review on chemical stimulation techniques in oil industry and applications to geothermal systems", Deep Heat Mining Association, 2007, pp. 1-34.

Sabouni, R., et al. "Effect of hydrodynamics on nanoparticles stability in Pickering emulsions stabilized by metal organic frameworks (MOFs) in reversing shear flow" Colloids and Surfaces A: Physicochemical Eng. Aspects 484 (2015) 416-423.

\* cited by examiner

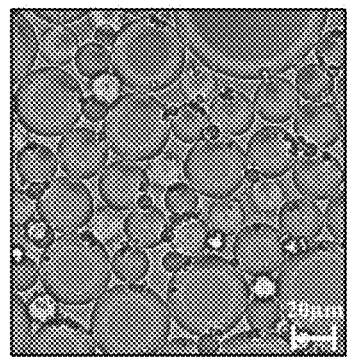 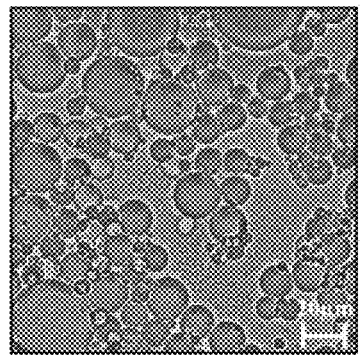 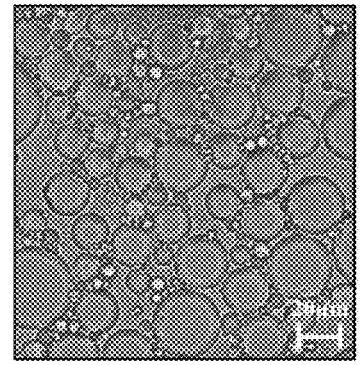
FIG. 3A  FIG. 3B  FIG. 3C
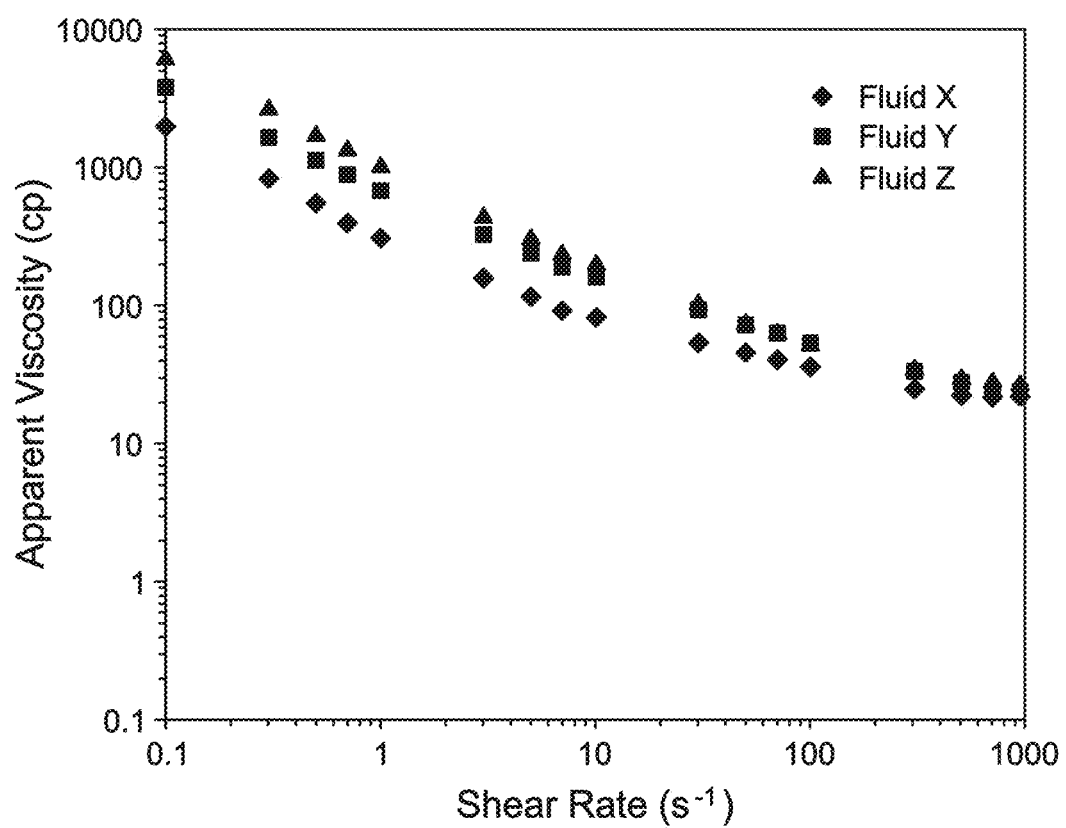
FIG. 4

TARGETING ENHANCED PRODUCTION THROUGH DEEP CARBONATE STIMULATION: STABILIZED ACID EMULSIONS CONTAINING INSOLUBLE SOLID MATERIALS WITH DESIRED WETTING PROPERTIES

RELATED APPLICATIONS

This patent application is a continuation of U.S. Non-Provisional patent application Ser. No. 15/381,670 filed on Dec. 16, 2016, which claims priority to U.S. Provisional Patent Application Ser. No. 62/268,714 filed on Dec. 17, 2015, both of which are incorporated by reference in their entirety.

TECHNICAL FIELD

The present invention relates to a composition for enhanced deep carbonate formation stimulation in hydrocarbon reservoirs. More specifically, the present invention relates to compositions for producing stabilized emulsified acids characterized by increased thermal stability for enhanced deep carbonate formation stimulation.

BACKGROUND

To meet rising global demands for energy, the oil and gas industry continuously strives to develop innovative oilfield technologies. A large portion of the world's oil and gas reserves are trapped in carbonate reservoirs, particularly in the Middle East. The mineralogy of these heterogeneous carbonate formations primarily consists of calcite, dolomite or combinations thereof. Accordingly, well stimulation treatments for these formations have traditionally relied upon the use of strong mineral acids (live acid), e.g. hydrochloric acid (HCl) ranging in concentration from 15-28 weight percent (wt %). Depending on the reservoir and production challenge associated with it, matrix acidizing or acid fracturing may be employed. Acid fracturing is favored for the stimulation of tight formations where the fluid is injected at a pressure exceeding the formation pressure in order to etch the surface and maintain the continuity of the fractures and create wormholes that propagate deeper into the reservoir. Conversely, matrix acidizing, a procedure in which acid is injected into the reservoir below the formation pressure, is widely used after drilling production wells in order to create a localized distribution of wormholes that are narrow and linear in nature that circumvent the damaged zone. In the field, treatment with fluids like strong mineral acids (e.g., hydrochloric acid (HCl)) is preferred because the fluid reacts with calcite and dolomite to yield products that are readily soluble in water; hence formation damage is negligible. Additionally, the strong mineral acids tend to be economically favorable. Notably, the longevity and practical application of this treatment with strong mineral acid raises serious concerns from both a corrosion standpoint and because the rapid reaction kinetics (rock-HCl) causes the live acid to be spent quickly. As a result of the reaction kinetics, large volumes of acid are required and even still, deeper penetration of live acid into the reservoir is not achieved. An assortment of alternative approaches (e.g. use of organic acids, gelled acids, synthetic acids, etc.) have been proposed to address these challenges, each of which are associated with advantages and disadvantages. Among the most popular is emulsification of HCl in diesel, widely known as conventional emulsified acids. Accordingly, they are classified as a water-in-oil (W/O) emulsions where droplets containing strong mineral acid, i.e. HCl ranging in concentration from 15-28 wt % are present in a continuous hydrocarbon phase (e.g. diesel). Conventional emulsified acids are widely used in the oil and gas industry to stimulate carbonate reservoirs. Emulsions are traditionally stabilized by the addition of amphiphilic surfactant-based emulsifiers. The surfactant stabilized acid emulsions are characterized by a hydrophilic head group and hydrophobic tail that serve as an anchor or bridge between the oil-water interfaces to reinforce the structural integrity of the droplets by minimizing the interfacial tension and lowering the surface energy. In the reservoir, the desired mechanism of delayed acid release is primarily governed by downhole conditions such as the temperature, pressure, pH and capillary forces. These parameters trigger the emulsion droplets to spontaneously break and release concentrated HCl. The live acid then reacts with the carbonate formation to produce a conductive wormhole network which continues until all of the acid is spent. The conventional emulsified acid system is favored because it produces more directional wormholes than a regular HCl acid injection, due to the slower acid-rock reaction kinetics. However, improvements to this system are needed as the former still possess a fast reaction time that results in a high concentration of wormholes near the inlet to the formation because the conventional emulsions still comparatively react quickly with the rock as the fluid is injected.

SUMMARY

The present invention relates to a composition for enhanced deep carbonate formation stimulation in hydrocarbon reservoirs. More specifically, the present invention relates to compositions for stabilized emulsified acids characterized by increased thermal stability for enhanced deep carbonate formation stimulation.

In one aspect of the present invention, a stabilized emulsified acid composition for deep carbonate formation stimulation is provided. The stabilized emulsified acid composition includes a petroleum, the petroleum operable to provide a barrier between an acid and a reservoir rock, the acid, the acid operable to react with the reservoir rock to dissolve the reservoir rock and produce a wormhole, a functional framework, the functional framework operable to stabilize the stabilized emulsified acid, an emulsifier, the emulsifier operable to stabilize the stabilized emulsified acid, and a corrosion inhibitor, the corrosion inhibitor operable to provide protection against corrosion for the metal components of a well.

In certain aspects of the present invention, the petroleum is diesel. In certain aspects of the present invention, the acid is hydrochloric acid. In certain aspects of the present invention, the functional framework is selected from the group comprising surface-modified clay-based materials, zeolites, hybrid organic-inorganic materials, and combinations thereof. In certain aspects of the present invention, the functional framework is a surface-modified clay material selected from an organoclay. In certain aspects of the present invention, the organoclay is a functionalized montmorillonite-based organoclay containing 25 to 30 wt % methyl dihydroxyethyl hydrogenated tallow ammonium. In certain aspects of the present invention, the stabilized emulsified acid composition further includes an emulsifier. In certain aspects of the present invention, the corrosion inhibitor is a cationic ammonium-based blend.

In a second aspect of the present invention, a stabilized emulsified acid composition is provided. The stabilized emulsified acid composition includes diesel, hydrochloric acid, a functionalized montmorillonite-based organoclay containing 25 to 30 wt % methyl dihydroxyethyl hydrogenated tallow ammonium, and a cationic ammonium-based blend.

In a third aspect of the present invention, a method of creating a wormhole extending deep into a carbonate formation is provided. The method includes the steps of introducing a stabilized emulsified acid with long-term thermal stability into a well that transverses a carbonate reservoir, the stabilized emulsified acid includes a petroleum, the petroleum operable to provide a barrier between an acid and a reservoir rock, the acid, the acid operable to react with the reservoir rock to dissolve the reservoir rock and produce the wormhole, a functional framework, the functional framework operable to stabilize the stabilized emulsified acid, an emulsifier, the emulsifier operable to stabilize the stabilized emulsified acid, and a corrosion inhibitor, the corrosion inhibitor operable to provide protection against corrosion for the metal components of a well. The method also includes the step of allowing the stabilized emulsified acid to react with the carbonate reservoir, wherein the reaction between the stabilized emulsified acid and the carbonate reservoir dissolves the carbonate reservoir and produces the wormhole, wherein the stabilized emulsified acid is stable for a reaction time, such that in the reaction time the wormhole reaches deep into the carbonate formation.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIG. 3A is a pictorial representation of the as-synthesized Fluid X of Example 2 at 50× objective highlighting the droplet size of the fluid.

FIG. 3B is a pictorial representation of the as-synthesized Fluid Y of Example 2 at 50× objective highlighting the droplet size of the fluid.

FIG. 3C(c) is a pictorial representation of the as-synthesized Fluid Z of Example 2 at 50× objective highlighting the droplet size of the fluid.

FIG. 4 is a graphic representation of the apparent viscosity of Example 2 in which Fluid X contains no clay additives. Fluid Y contains 0.25 wt % of Cloisite-15 and Fluid Z contains Nanoclay Nanomer® I.34TCN.

DETAILED DESCRIPTION

Figure 1:
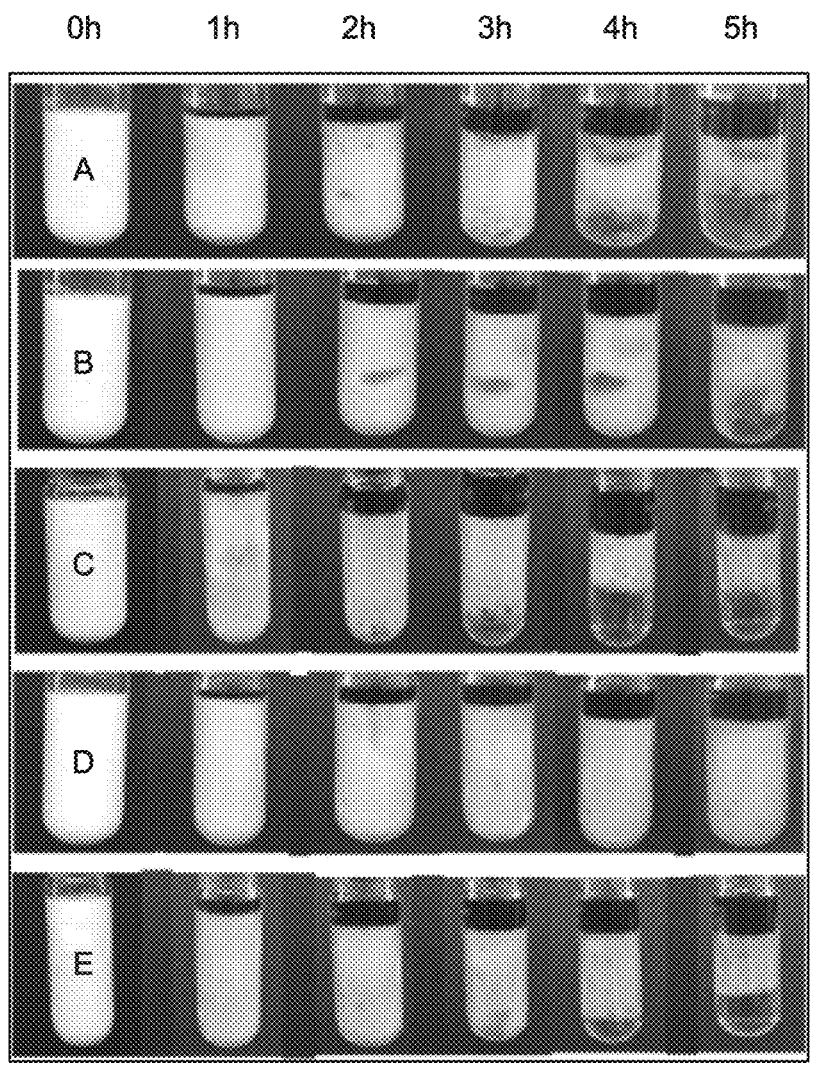
FIG. 1 is a pictorial representation of the static thermal stability screening studies performed at 150° C. (300° F.) in Example 1.

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In one embodiment, the stabilized emulsified acid composition of the present invention possesses long-term thermal stability in order to achieve deep carbonate stimulation. The stabilized emulsified acid of the present invention can result in reduced corrosion as compared to conventional emulsified acids. The stabilized emulsified acids of the present invention retard or delay the reaction of acid with the reservoir formation. By delaying the reaction, the stabilized emulsified acids of the present invention favor the formation of wormholes that penetrate deeper into the reservoir. As a result, the stabilized emulsified acids of the present invention lead to increased permeability in the stimulated zone.

As used herein, "deep carbonate formation" refers to a depth in a carbonate formation of between about three inches and about six feet from the wellbore, alternately a depth of between about one foot and about six feet from the wellbore, alternately a depth of between about two feet and about six feet from the wellbore, alternately a depth of between about three feet and about six feet from the wellbore, alternately a depth of between about four feet and about six feet from the wellbore, and alternately a depth of between about five feet and about six feet from the wellbore.

As used herein, "stabilize" refers to the ability of a component to prolong the longevity of an emulsion droplet at high temperatures, i.e. the mechanism by which the acid is released is significantly reduced as a function of time. In other words, a component that stabilizes the stabilized emulsified acid can be said to be maintaining the dispersion of acid droplets in the oil phase of the stabilized emulsified acid.

As used herein, "long-term thermal stability" or "long-term thermally stable" refers to an emulsion where separation of the aqueous phase and the oil phase into distinct layers at 300° F. (148.8° C.) does not occur for at least about 4 hours, alternately for at least about 5 hours, alternately for at least about 6 hours, alternately for at least about 7 hours, and alternately between about 6 hours and about 8 hours. A long-term thermally stable emulsion remains as a mixture and does fully not separate into separate fluid layers in less than 4 hours. Delaying separation of the emulsion delays release of acid, such that the acid does not react immediately but rather as the emulsion separates the droplets are broken and the acid can react with the formation. A long-term thermally stable emulsion results in a delayed release of a concentrated acid such that the fluid is permitted to propagate deep in the reservoir creating a conductive flow path until all live acid has been spent. While delayed separation of an emulsified acid is advantageous to avoid a rapid release of live acid and subsequent depletion of the live acid, some separation over time is desirable because otherwise no live acid would be released.

As used herein, "wetting properties" refers to the solid particles being partially wet, such that they have an affinity for both the oil phase and the aqueous phase of the stabilized emulsified acid, such that they can be adsorbed at the interface of the oil phase and water phase. By adsorbing at the interface, the solid particles provide additional support to the stabilized emulsified acid. The wettability of the solid particles can play a pivotal role towards improving overall stability of the emulsion droplets because the target is for the particle to reside at the interfacial boundary.

As used herein, "surface-modified clays" refers to the exchange of extra-framework metal cations located between the silicate layers of the clay matrix for organically modified quaternary ammonium-based molecules.

As used herein, "conventional emulsified acids" refers to acid in petroleum emulsions that are in the absence of solid-particle stabilizing particles. Conventional emulsified acids can include surfactants and other liquid additives. Conventional emulsified acids can be in the absence of solid-particle stabilizing agents.

As used herein, "carbonate dissolution" refers to the process of dissolving the calcite by means of reaction with an acid, such as HCl, as shown in equation 1:

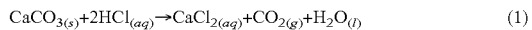

$$CaCO_{3(s)} + 2HCl_{(aq)} \rightarrow CaCl_{2(aq)} + CO_{2(g)} + H_2O_{(l)} \qquad (1)$$

As used herein, "pseudo-type Pickering emulsion" refers to a class of emulsions that use solid particles in conjunction with an emulsifier and corrosion inhibitor blend, the solid particles adsorb on the surface of a droplet at the interface between the oil phase and the water phase and reinforce its structural integrity. In the present invention, the solid particles do adsorb and stabilize the interface of the phases, however as stabilized emulsified acids of the present invention can include a liquid surfactant/emulsifier, the term "pseudo-type Pickering emulsion" is used.

As used herein, "wormhole" or "wormhole pattern" refers to the conductive channel formed by an acid emulsion. Wormholes create a permeable path for hydrocarbons, including oil and gas. In matrix acidizing wormhole propagation is preferably narrow, elongated and localized with minimal branching. In acid fracturing, wormhole propagation can include branching. Wormholes are formed when the acid reacts with carbonate rock in the reservoir. The acid reacts with the reservoir rock and dissolves the carbonate rock leaving behind a void pore space. The void pore spaces are coined wormholes because of their shape. One of skill in the art will understand that there are different wormhole structures: face dissolution, uniform dissolution, conical wormholes, ramified wormholes, and dominant wormholes.

As used herein, "live acid" refers to the acid in the stabilized emulsified acid prior to the reaction with reservoir rock. The acid remaining after reaction is referred to as "spent acid." As used herein, "spent" or "spent acid" refers to the point when the live acid has been fully consumed and can no longer react with the reservoir rock.

The stabilized emulsified acid compositions of the present invention can include a petroleum, an acid, a functional framework, and a corrosion inhibitor. The stabilized emulsified acid compositions of the present invention can include a petroleum, an acid, a functional framework, a corrosion inhibitor, and an emulsifier.

Compared to the conventional emulsified acids, the stabilized emulsified acid compositions of the present invention, prepared by doping the diesel phase with functional frameworks in conjunction with a suitable emulsifier and corrosion inhibitor blend, advantageously leads to: (1) improved chemical and thermal stability of the resultant water-in-oil (W/O) emulsion; (2) the formation of narrow and localized distribution of wormholes that propagate deeper into the core sample; (3) a stabilized emulsified acid system that can achieve eighteen fold improvement in core permeability compared to the conventional emulsified acid system.

Advantageously, the stabilized emulsified acids of the present invention exhibit reduced face dissolution at higher flower rates, such as flow rates above 5 cubic centimeter/minute (cc/min) as compared to the conventional acid systems with no additives. Advantageously, the cost-effective nano-additives were successfully shown to improve the performance of emulsified acid systems at high temperature (up to 300° F.), which in turn improved the acid penetration rate and wormhole propagation. The stabilized emulsified acids of the present invention can improve the outcome of acidizing treatment in both calcite and dolomite reservoirs whether the acid treatment is matrix acidizing or acid fracturing. "Optimal flow rate" refers to the flow rate at which dominant wormholes are created using the least amount of acid to achieve breakthrough ($PV_{BT}$). The stabilized emulsified acids of the present invention exhibit prolonged lifetimes of the live acid allowing deeper penetration into the reservoir formation, which creates a more conductive path for the oil and gas to flow from the reservoir formation. In at least one embodiment, the stabilized emulsified acids of the present invention enhance the thermal and chemical stability of the acid emulsion through the use of a pseudo-type Pickering emulsion approach. Advantageously, the stabilized emulsified acids of the present invention can reduce corrosion-related issues of the downhole equipment as compared to conventional emulsified acids, which prolongs the life of tubulars and drives down overall cost.

The petroleum of the present invention can be any oil capable of providing a barrier between the live acid and the reservoir rock, such that the barrier delays or slows the reaction between the live acid and the reservoir rock. The stronger the barrier, the slower the reaction between the live acid and the reservoir rock. The petroleum can be inexpensive, have a low toxicity, and avoid formation damage. Examples of petroleum suitable for use in the present invention include diesel, kerosene, aromatics, refined hydrocarbons and combinations of the same. Aromatics can include benzene, toluene, xylene and ethylbenzene, and other aromatic hydrocarbons. Refined hydrocarbons can include aliphatic hydrocarbons, such as alkanes, alkenes, and alkadienes, alicyclic hydrocarbons, such as cyclohexane, esters, and derivatives of these compounds, as well as combinations of the same. Examples of aliphatic hydrocarbons include n-octane, n-decane, n-tridecane, and higher carbon number alkanes. In at least one embodiment of the present invention, the petroleum is diesel.

The acid of the present invention can be any mineral (inorganic) acid or organic acid capable of dissolving a carbonate reservoir. Examples of acids suitable for use in the present invention include HCl, sulfuric acid ($H_2SO_4$), methanesulfonic acid, nitric acid ($HNO_3$), phosphoric acid ($H_3PO_4$), hydrofluoric acid (HF), hydrobromic acid (HBr), boric acid ($H_3BO_3$), fluoroboric acid ($H_3OBF_4$), formic acid ($CH_2O_2$), acetic acid ($C_2H_4O_2$), glycolic acid ($C_2H_4O_3$), mono- and polycarboxylic acids, aminocarboxylic acids, sulfonic acids, chloroacetic acid ($C_2H_3ClO_2$), hydroxyacetic acid and combinations of the same. In at least one embodiment of the present invention, the acid is HCl. HCl is suitable for use in the present invention because it is inexpensive and effective at dissolving carbonate reservoir rock, the reaction with carbonate produces reaction products that are soluble in water. As used herein, "aqueous phase" or "dispersed phase" refers to the combination of acid and water. The acid can be present in the aqueous phase at a concentration of less than 30 wt %, alternately less than 25 wt %, alternately less than 20 wt %, alternately less than 15 wt %, alternately less than 10 wt %, and alternately less than 5 wt %. In embodiments where the acid is HCl, the acid can be present in the aqueous phase at a concentration in the range of 15 wt % to 28 wt %. In embodiments where the acid is acetic acid, the acid can be present in the aqueous phase at a concentration less than 13 wt %. In embodiments where the acid is formic acid, the acid can be present in the aqueous phase at a concentration less than 9 wt %.

In at least one embodiment of the present invention, the aqueous phase can include an acid producing precursor instead of an acid. As used herein, an "acid producing precursor" refers to a compound that reacts with water to yield acid products. Examples of an acid producing precursor suitable for use in the present invention include benzenesulfonyl chloride and organic ligands containing cyano groups. Benzenesulfonyl chloride reacts with water to produce HCl and benzenesulfonic acid. Organic ligands containing cyano groups can hydrolyze via an acid/base reaction to yield a carboxylic acid.

The ratio of aqueous phase to oil phase in the stabilized emulsified acid composition can be in a range of between 50:50 and 80:20, alternately between 60:40 and 80:20, alternately between 70:30 and 80:20, and alternately between 75:25 and 80:20. As used herein, "oil phase" or "continuous phase" refers to the combination of the petroleum, emulsifier, and corrosion inhibitor. In at least one embodiment of the present invention, the ratio of aqueous phase to oil phase in the stabilized emulsified acid composition is between 70:30 and 75:25. In at least one embodiment of the present invention, the ratio of aqueous phase to oil phase in the stabilized emulsified acid composition is 70:30. Without being bound to a particular theory, the ratio of aqueous phase to oil phase in the stabilized emulsified acid composition should be maintained at or above a ratio of 3:2, at ratios less than 3:2, the formation of an oil-in-water (O/W) emulsion is favored. A water-in-oil (W/O) emulsion is favored because in a water-in-oil (W/O) emulsion the aqueous acid is protected by the oil phase and does not rapidly react with the formation.

The functional framework is any insoluble solid material or dispersion capable of stabilizing the acid emulsions. Without being bound to a particular theory, it is believed that the functional frameworks serve as emulsion stabilizers by preferentially adsorbing at the oil-water interface, which reduces the interfacial tension of the droplets and offers enhanced stability. Functional frameworks suitable for use in the present invention can be less than 20 microns. In at least one embodiment, functional frameworks suitable for can be nano-sized, for example less than 1000 nm. The functional framework can include surface-modified clay-based materials, zeolites, and hybrid organic-inorganic materials, and combinations of the same. In at least one embodiment, a functional framework can be a composite material constructed from the assembly of hybrid organic-inorganic materials and boron nitride nanotubes. The functional framework can be present in the oil phase at a concentration of less than about 0.75 wt %, alternately in an amount between about 0.10 wt % and about 0.75 wt %, alternately in an amount between about 0.10 wt % and about 0.50 wt %, alternately in an amount between about 0.20 wt % and about 0.40 wt %, and alternately in an amount between about 0.20 wt % and about 0.30 wt %.

Surface-modified clay-based materials include organoclays that are silicate-based clay minerals delimited by a 2-periodic layered structure, where a percentage of the charge-balancing metal counter-ions, located between the silicate layers, are replaced with functionalized quaternary ammonium cations. In surface-modified clay-based materials suitable for use in the stabilized emulsified acids of the present invention, the relative spacing between neighboring layers is highly modular, such that the wetting behavior of the surface-modified clay-based material can be fine-tuned via exchange of extra-framework cations. Examples of surface-modified clay-based materials include montmorillonite containing a percentage of extra-framework quaternary ammonium cations, such as a functionalized montmorillonite-based organoclay containing 25-30 wt. % methyl dihydroxyethyl hydrogenated tallow ammonium, montmorillonite containing dimethyl dihydrogenated tallow quaternary ammonium, montmorillonite containing dimethyl, benzyl, hydrogenated tallow quaternary ammonium, and montmorillonite containing 35-45% dimethyl dialkyl amine. In at least one embodiment, the functional framework is a functionalized montmorillonite-based organoclay containing 25-30 wt. % methyl dihydroxyethyl hydrogenated tallow ammonium. In embodiments where the functional framework is a surface-modified clay-based material, the functional framework can be present at a concentration of less than about 0.75 wt %, alternately in an amount between about 0.10 wt % and about 0.75 wt %, alternately in an amount between about 0.10 wt % and about 0.50 wt %, alternately in an amount between about 0.20 wt % and about 0.40 wt %, and alternately in an amount between about 0.20 wt % and about 0.30 wt %. In at least one embodiment of the present invention, where the surface-modified clay-based material is a functionalized montmorillonite-based organoclay containing 25-30 wt % methyl dihydroxyethyl hydrogenated tallow ammonium the addition of the surface-modified clay-based material at a concentration greater than 0.75 wt % can lead to destabilization of the emulsion shortly after mixing, at least less than 30 minutes. In at least one embodiment of the present invention, where the surface-modified clay-based material is a functionalized montmorillonite-based organoclay containing 25-30 wt % methyl dihydroxyethyl hydrogenated tallow ammonium the surface-modified clay-based material added at a concentration of 0.25 wt % exhibits stability for at least 5 hours at 300° F. Robust stabilized emulsified acids that exhibit enhanced stability under downhole conditions with minimal amounts of functional framework are advantageous both for performance reasons and economically.

Zeolites suitable for use in the present invention include functionalized zeolite forms. Examples of zeolites suitable for use include functionalized forms of ZSM-5, Zeolite-Y, and combinations thereof.

As used herein, "hybrid organic-inorganic materials" refers to solid-state crystalline materials constructed from the in-situ assembly of highly modular pre-designed molecular building blocks (MBBs) into discrete architectures (0-D) or extended architectures (1-D, 2-D, 3-D).

Hybrid organic-inorganic materials includes coordination polymers, metal-organic frameworks (MOFs), and metal-organic materials. In at least one embodiment, the hybrid organic-inorganic materials can be biodegradable. In at least one embodiment the hybrid organic-inorganic materials can exhibit limited or no toxicity. The hybrid organic-inorganic materials suitable for use in the present invention can include metal-organic frameworks (MOFs), zeolitic imidazole frameworks (ZIFs), zeolite-like metal-organic frameworks (ZMOFs), and coordination polymers. Examples of MOFs suitable for use in the present invention can include Fe-MIL-101 and ZIF-8.

Hybrid organic-inorganic materials use linkers, also known as ligands to link the metal ions together. Examples of linkers include carboxylic acids, nitrogen-based ligands, cyano-based ligands that hydrolyze to produce a carboxylic acid, and heterofunctional ligands. Examples of carboxylic acid linkers include mono-, di-, tri-, hexa-, and octa-carboxylic acids. Examples of nitrogen-based ligands/N-donor include pyridyl- and triazolyl-type moieties. Examples of heterofunctional ligands include 4,5-imidazoledicarboxylic acid. Examples of cyano-based ligands that undergo acid/base hydrolysis to produce a carboxylic acid include 4,5-dicyanoimidazole.

Covalent-organic frameworks (COFs) are crystalline porous materials that include organic-based ligand precursors (for example, boron, carbon, nitrogen, oxygen and silicon ligand precursors) that can, under suitable reaction conditions, be bridged together via the formation of strong covalent bonds to form robust discrete and extended architectures.

Boron nitride nanotubes can be functionalized. Boron nitride nanotubes can have a surface area of greater than 1500 m2/g.

In at least one embodiment, a hydrophilic solid particle can be added to the aqueous phase and a hydrophobic solid particle can be added to the oil phase, where the hydrophilic solid particle and the hydrophobic solid particle preferentially interact to produce enhanced stability at the interface of the droplet.

The corrosion inhibitor can be any component capable of providing protection for the tubular components of the well from corroding as a result of the injection of acid of the present invention. In at least one embodiment, the corrosion inhibitor is part of a cationic surfactant package that includes an emulsifier and a corrosion inhibitor. In at least one embodiment, the cationic surfactant package can include a cationic ammonium-based blend. The cationic ammonium-based blend is a blend that includes an emulsifier and a corrosion inhibitor. Advantageously and unexpectedly, in certain embodiments of the stabilized emulsified acid the combination of a cationic ammonium-based blend and surface-modified clay-based material exhibit a synergy leading to long-term thermal stability as compared to the combination of an emulsifier and a separate corrosion inhibitor and surface-modified clay-based material.

In certain embodiments, the stabilized emulsified acid includes an emulsifier. The emulsifier forms part of the oil phase and can reside at the interlayer boundary between the oil phase and the aqueous phase. The emulsifier serves as a stabilizer to minimize the surface tension between the two phases. The emulsifier can be a hydrophobic emulsifier. The emulsifier can be a cationic emulsifier. In at least one embodiment, the emulsifier is part of the cationic surfactant package. In the absence of an emulsifier, more of the functional framework would need to be added to achieve comparable emulsion stability. Adding more functional framework can increase the viscosity of the fluid, which is detrimental because high viscosity can result in increased friction loss.

In at least one embodiment of the present invention, the stabilized emulsified acids can be used for matrix acidizing, with propagation between three inches and six feet from the wellbore. In at least one embodiment of the present invention, the stabilized emulsified acids can be used for acid fracturing with propagation up to several hundred feet.

In at least one embodiment of the present invention, stabilized emulsified acid includes the aqueous phase containing water and HCl, and the oil phase containing diesel, the functionalized framework, and a cationic ammonium-based blend with the ratio of aqueous phase to oil phase is 70:30.

EXAMPLES

Example 1

In the first example, a comparison of five different samples of acid emulsions was conducted. Fluid A was a comparison sample using a solid material that was not functionalized and contains the parent montmorillonite clay additive. Fluids B-E were prepared according to the present invention using functional frameworks selected from surface-modified clay-based materials. For each of the Fluids, diesel (purchased from a local gas station) was added to a beaker containing 0.25 wt % of the solid material or functional framework, according to Table 1. The solution was subsequently sonicated to assist in dispersing the solid material in the oil phase. To the homogeneous mixture was added 1.0 volume/volume percent (v/v %) of a cationic surfactant package and continuously stirred for approximately ten minutes. A stock solution of 15 wt % HCl (aqueous acid) was prepared and added dropwise to the mixture while vigorously mixing using a homogenized mixer at 3000 revolutions per minute (RPM). The aqueous phase to oil phase ratio in each of the samples was 70:30. Each of the five Fluids produced an acid emulsion and each was observed to be white as shown in FIG. 1 at time (0 h).

TABLE 1

Composition of each Fluid

| Fluid | Petroleum | Acid | Solid Material or Functional Framework | Cationic Surfactant Package |
|---|---|---|---|---|
| A | Diesel (Gas Station) | 15 wt % HCl | Montmorillonite | ARMOSTIM H-MUL CI |
| B | Diesel (Gas Station) | 15 wt % HCl | Cloisite ®-15 | ARMOSTIM H-MUL CI |
| C | Diesel (Gas Station) | 15 wt % HCl | Cloisite ®-10A | ARMOSTIM H-MUL CI |
| D | Diesel (Gas Station) | 15 wt % HCl | Nanoclay Nanomer ® I.34MN | ARMOSTIM H-MUL CI |
| E | Diesel (Gas Station) | 15 wt % HCl | Nanoclay Nanomer ® I.44P | ARMOSTIM H-MUL CI |

Cloisite®-15 from Southern Clay Products is a montmorillonite based clay containing dimethyl dihydrogenated tallow quaternary ammonium. Cloisite®-10A from Southern Clay Products is a montmorillonite based clay containing dimethyl, benzyl, hydrogenated tallow quaternary ammonium. Nanoclay Nanomer® I.34MN from Nanocor Corporation (purchased from Sigma-Aldrich®) is a functionalized montmorillonite-based organoclay containing 25 to 30 wt % methyl dihydroxyethyl hydrogenated tallow ammonium.

Nanoclay Nanomer® I.44P from Nanocor Corporation is a montmorillonite based clay containing 35-45% dimethyl dialkyl ($C_{14}$-$C_{19}$) amine. The cationic surfactant package, ARMOSTIM H-MUL CI, was a cationic ammonium-based blend obtained as a sample from AkzoNobel®.

Each Fluid sample was heated in an Ace Glass Pressure tube in a temperature-controlled recirculating oil bath to a temperature of 150° C. (300° F.). The thermal stability of each of the Fluids was observed over the course of five (5) hours, as can be seen in FIG. 1. Based on the results, Fluid D surprisingly and unexpectedly exhibited superior performance in terms of thermal stability under static conditions and ambient pressures. As can be seen in FIG. 1, at the five (5) hour mark Fluid D is still a homogeneous acid emulsion with no apparent acid layer present (bottom layer). In comparison, Fluid A, Fluid B, Fluid C, and Fluid E began to show signs of separation at three (3) hours and have clearly separated layers at four (4) hours. It was unexpected that such small changes in the functionalization of the surface-modified clay-based material, such as between Fluid D and Fluid E would produce such different results with respect to stability.

Figure 2:
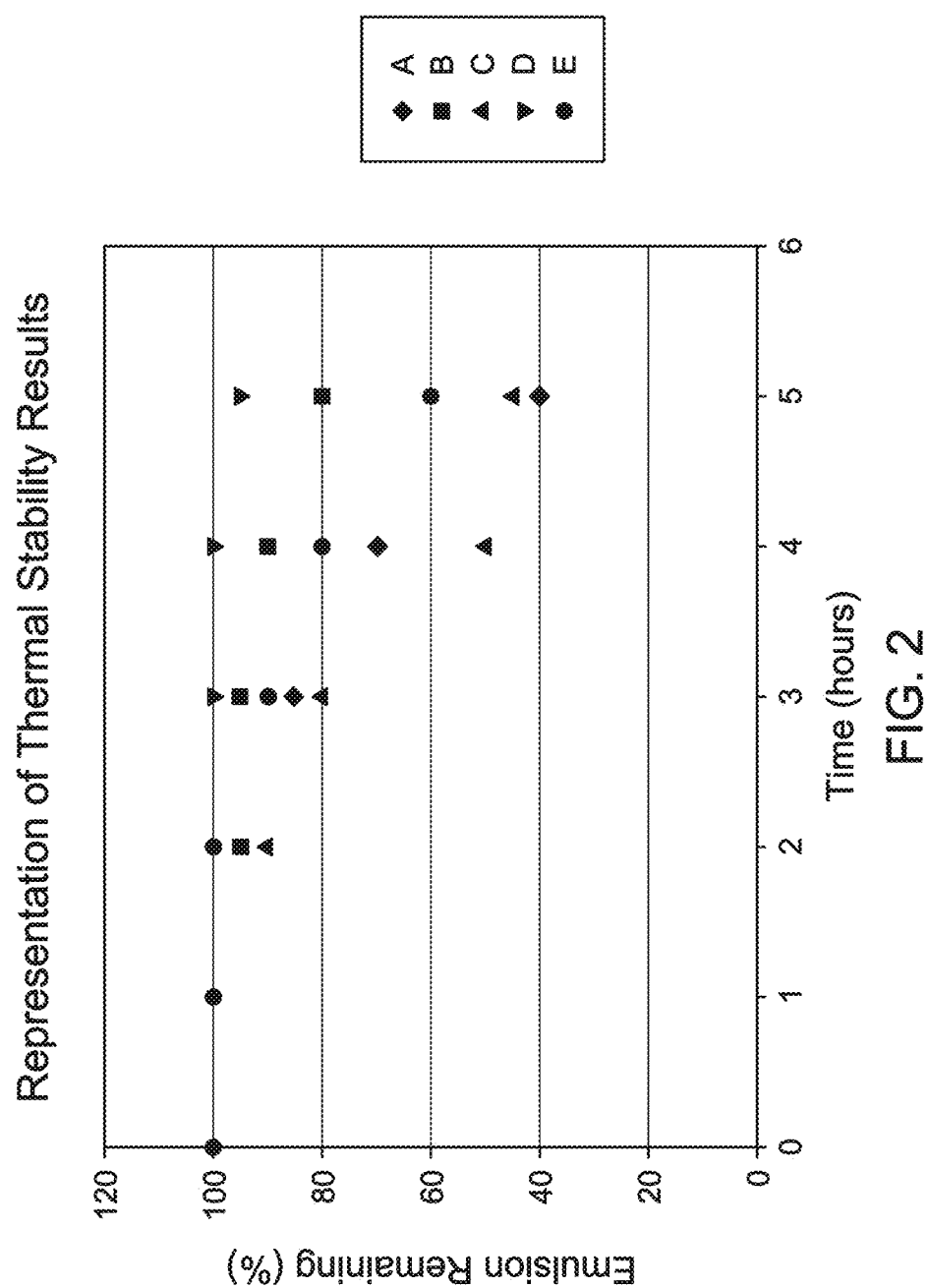
FIG. 2 is a graphic representation of the thermal stability studies of Example 1.

FIG. 2 provides a graphical representation of the thermal stability studies. As can be seen the montmorillonite of Fluid A performs poorly in the thermal stability studies. In Fluid C signs of separation from the emulsion were seen after three (3) hours. While Fluid B also showed signs of separation, the emulsion remained fairly stable and cohesive after some initial separation.

Examples 2

In Example 2, the apparent viscosity of three fluids was measured and depicted graphically.

Fluid X was an emulsion of 15 wt % HCl in the dispersed phase and a ratio of diesel to emulsifier of 29:1 in the continuous phase, where the ratio of dispersed phase to continuous phase was 70:30. In particular, diesel was added to a 500-mL beaker, covered and set to stir at a rate of 450 RPM using an IKA-RW20 digital overhead mixer equipped with a three-prong blade. In this example, a modified cover was designed to permit addition of the chemicals and thus minimize loss due to vigorous mixing. Next, a cationic surfactant package was added to the beaker and stirred for 10 minutes. A stock solution of 15 wt % HCl (aqueous phase) was prepared and added to a 250-mL separatory funnel. Under constant stirring, the aqueous phase was added dropwise to the diesel phase. Upon complete addition of the aqueous phase, the mixture was permitted to stir for an additional 30 minutes prior to characterization to ensure homogeneity of the resultant emulsion. The electric conductivity was measured for all prepared emulsions and determined to be zero; thus confirming successful formation of an acid-in-diesel emulsion in which case all HCl was encapsulated within the emulsion droplet.

Fluid Y was a stabilized emulsified acid containing Cloisite®-15 as an additive. Fluid Y was prepared according to the method described with reference to Fluid X, with one difference. For Fluid Y, 0.25 wt % of Cloisite®-15 was pre-weighed using an analytical balance and independently added to a 500-mL beaker. Diesel was then added to the beaker containing the Cloisite®-15 and the mixture was sonicated until the solid particles were fully dispersed. All other steps were the same as that of preparing Fluid X. The mixture was then stirred at a rate of 450 RPM using an IKA-RW20 digital overhead mixer equipped with a three-prong blade. All other steps for preparing Fluid Y were the same as those for Fluid X beginning after the oil phase was stirred.

Fluid Z was prepared according to the method described with reference to Fluid Y, with one difference. For Fluid Z, 0.25 wt % of Nanoclay Nanomer® I.34MN was used instead of Cloisite®-15 as the functional framework. As described with reference to Example 1, Nanoclay Nanomer® I.34MN is a functionalized montmorillonite-based organoclay containing 25 to 30 wt % methyl dihydroxyethyl hydrogenated tallow ammonium.

FIGS. 3A, 3B, and 3C are photo-micrographs of the as-synthesized emulsified acids measured using a 50x objective. FIG. 3A is a photo-micrograph showing the droplet size of the as-synthesized Fluid X. FIG. 3B is a photo-micrograph showing the droplet size of the as-synthesized Fluid Y. FIG. 3C is a photo-micrograph showing the droplet size of the as-synthesized Fluid Z. The images show that the addition of nanoclay (Fluids Y and Z) yields on average smaller droplets, which is indicative of a more stable emulsion droplet as is demonstrated in Example 2.

FIG. 4 provides a graphic representation of the apparent viscosity (cP) as a function of shear rate (0.1 to 1000 $s^{-1}$). Without being bound to a particular theory, it has been observed that the apparent viscosity of an emulsified acid is affected by the droplet size and its relative distribution in the dispersed phase. A sharp distribution of small emulsion droplets is characteristic of a more viscous fluid that is inherently more stable in nature. FIG. 4 confirms what is expected based on what is seen in FIGS. 3A, 3B, and 3C, Fluid Y and Fluid Z, with the smaller droplet size, exhibit apparent viscosities that are higher for those stabilized systems than for Fluid X. This is particularly evident at shear rates below 100 Table 2 contains a summary of the Power-law parameters calculated by fitting each of the curves in FIG. 4 to equation 2.

The apparent viscosity of Fluid X, Fluid Y, and Fluid Z was measured at 300° F. and applying shear rates up to 100 As shown in FIG. 4, the logarithmic plot of viscosity (cP) as a function of increasing shear rate ($s^4$) gave a linear slope in all cases where a decrease in viscosity was observed with increased shear. This is in accordance with the behavior of a Non-Newtonian shear-thinning fluid and thus can be fitted to the power-law model as represented by equation 2:

$$\mu_a = K\gamma^{(n-1)} \quad (2)$$

where K is the power-law consistency factor in g/cm·s$^{(n-2)}$, n is the power-law index, $\mu_a$ is the apparent fluid viscosity in cP, and $\gamma$ is the shear rate ($s^{-1}$),

TABLE 2

Summary of Power-law parameters for Fluid X, Fluid Y, and Fluid Z measured at 300° F.

| Fluid | Power-law Constant, K (mPa · s$^n$) | Power-law Index, n | $R^2$ Factor |
| --- | --- | --- | --- |
| Fluid X | 359.7 | 0.465 | 0.9665 |
| Fluid Y | 729.0 | 0.412 | 0.9882 |
| Fluid Z | 1050.4 | 0.333 | 0.9909 |

For the calculations in Table 2, shear rate data points above 300 $s^{-1}$ were omitted from this calculation in order to remove the artifacts of shear independency observed at higher shear rates.

Example 3

In Example 3, coreflood experiments were performed to test the acidizing efficiency of three fluids. Coreflood experiments were performed using Fluid X, Fluid Y, and Fluid Z prepared as described in Example 2.

Table 3 contains a summary of the experimental coreflood data obtained from the linear coreflood experiments. Each coreflood experiment was a 15 hour (h) acid shut-in experiment performed at 300° F. (148.9° C.) and 3000 psi (20,864 kPa) at a flow rate of 2 cc/min for a total volume of acid injected (pore volume (PV)) of 0.65. The core was an Indiana Limestone core having a core length of 12 inches (12″) and a diameter of 1.5″. It should be noted that the volume of acid injected was normalized across all core samples.

TABLE 3

Summary of 12″ core data, experimental parameters and results from shut-in experiments conducted at 3000 psi and 300° F. in order to evaluate the overall performance of the stabilized emulsified acids compared to a conventional emulsified acid system.

| Characteristic | Fluid X | Fluid Y | Fluid Z |
| --- | --- | --- | --- |
| Core Pore Volume (cc) | 53 | 53 | 53 |
| Core Porosity (%) | 15.2 | 15.3 | 15.3 |
| Initial Permeability (mD) | 3.75 | 3.54 | 3.84 |
| Final Permeability (mD) | 33 | 174 | 609 |
| Enhancement in Permeability | 8.80 | 49.2 | 159 |

The success of the stabilized emulsified acid of the present invention is evident by the fact that injection of the same volume of fluid (0.65 PV) resulted in a 5.6-fold enhancement in permeability for Fluid Y and an 18-fold enhancement in permeability for Fluid Z as compared to Fluid X under analogous acid-rock contact time. An 18-fold enhancement in permeability was observed after the core sample was flushed with the solvent (i.e., isopropanol) to remove any residual emulsion remaining in the sample. Flushing with a mutual solvent is often done in the field.

Figure 5:
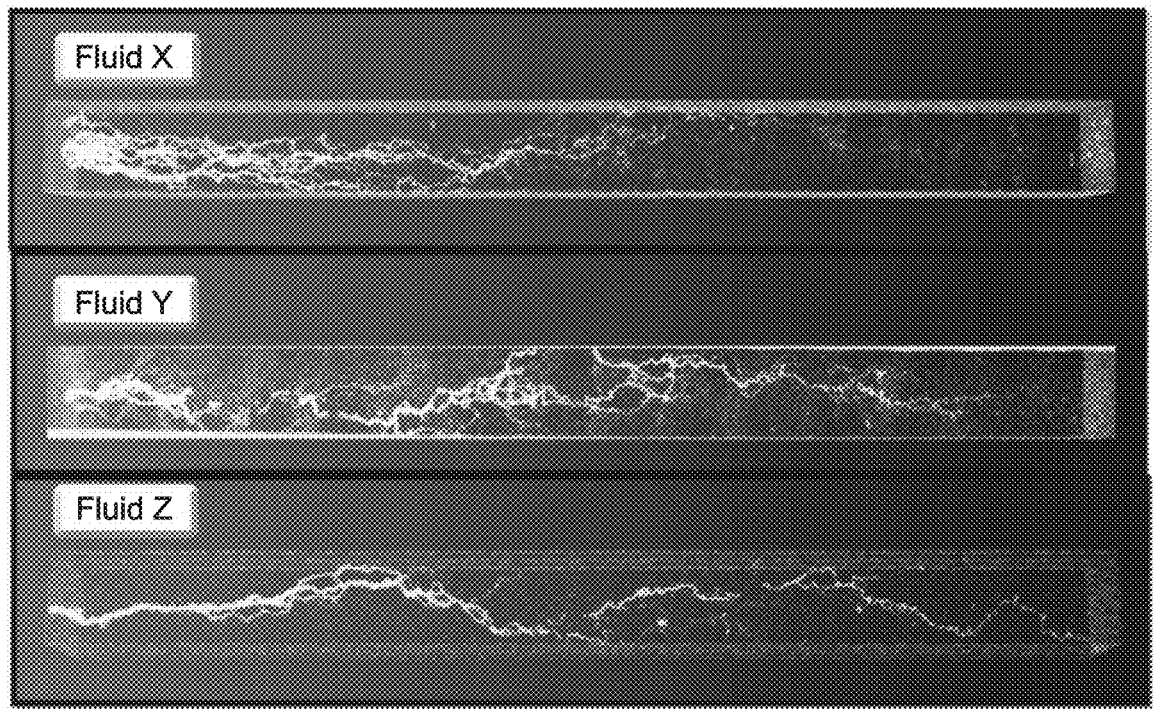
FIG. 5 is CT scan images for the acid treated core samples of Example 3.

FIG. 5 shows the computed tomography (CT) images from the coreflood experiments for each of the cores after acid injection at 2 cc/min and a shut-in period of 15 hours at 3000 psi and 300° F. The images in FIG. 5 show that the stabilized emulsified acids, Fluid Y and Fluid Z, afford less face dissolution as compared to the conventional emulsified acid system, Fluid X. As used herein, "face dissolution" refers to the extent of calcite solubility at the inlet (face) of the core sample compared to a conventional system as in Fluid X. The reduced face dissolution permits the live acid to penetrate deeper into the core sample before being spent. The result is a more localized and direct wormhole pattern, a more directional path, characterized by deeper penetration into the core and suggestive of enhanced stimulation deep into the reservoir.

Figure 6:
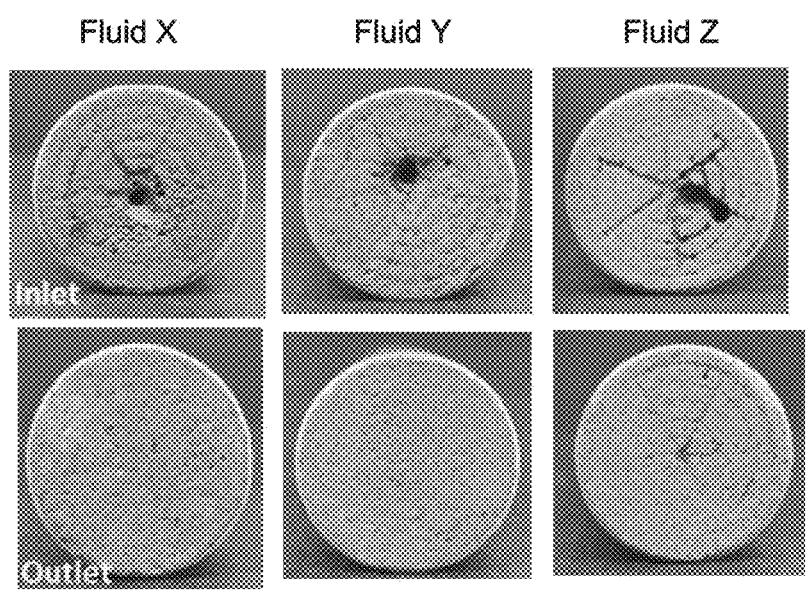
FIG. 6 is pictorial depiction of the 12" core samples of Example 3 after the fluid injection at a flow rate of 1 cc/min for both the inlet (top) and outlet (bottom) of the core.

FIG. 6 shows the core samples following the 15h shut-in experiment at the inlet and outlet. In FIG. 6, Fluid X, as compared to Fluid Y and Fluid Z, has more face dissolution which is in agreement with the CT data.

Figure 7:
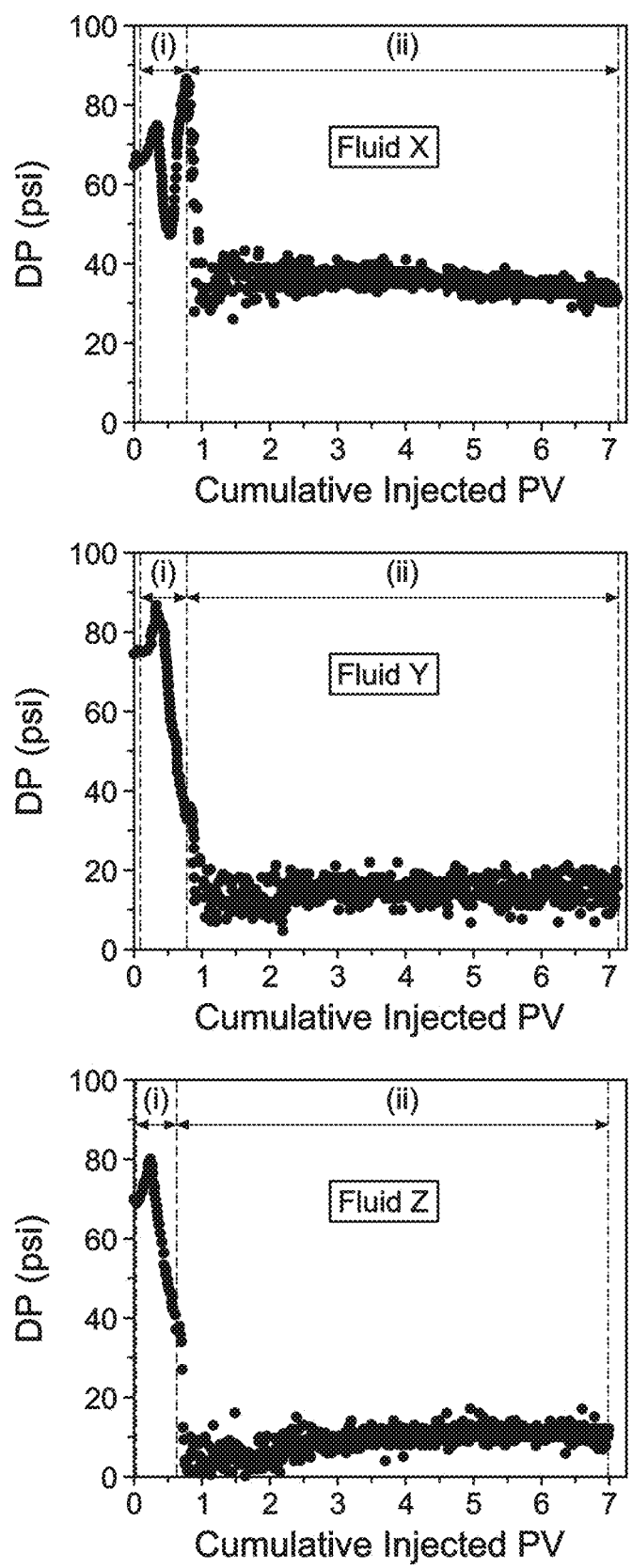
FIG. 7 is a graphical representation of the coreflood results of Example 3 after (i) injection of 0.65 PV of acidizing fluid at 2 cc/min and (ii) post-flush with 6 PV of deionized water.
Figure 8A:
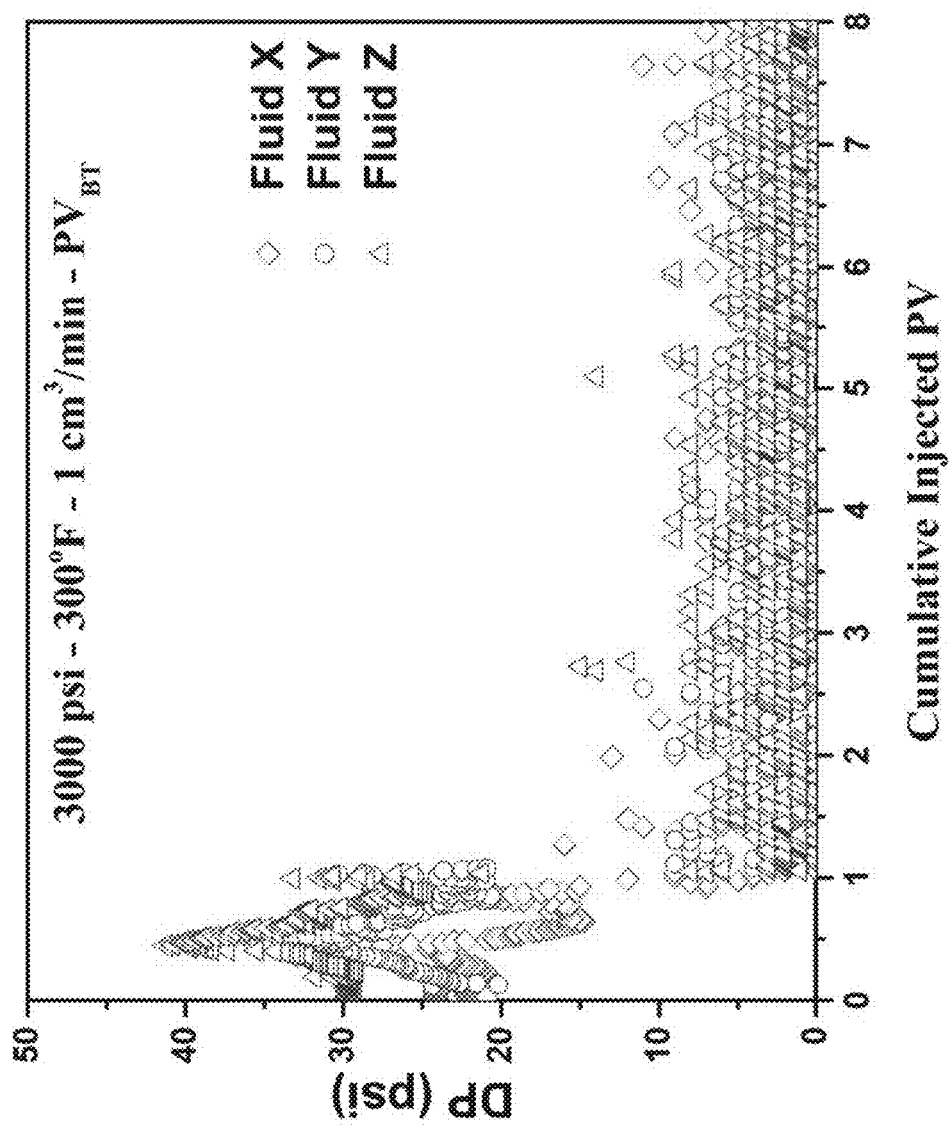
FIG. 8A is a graphical representation of the coreflood data for Example 4 at an injection rate of 1 cc/min.
Figure 8B:
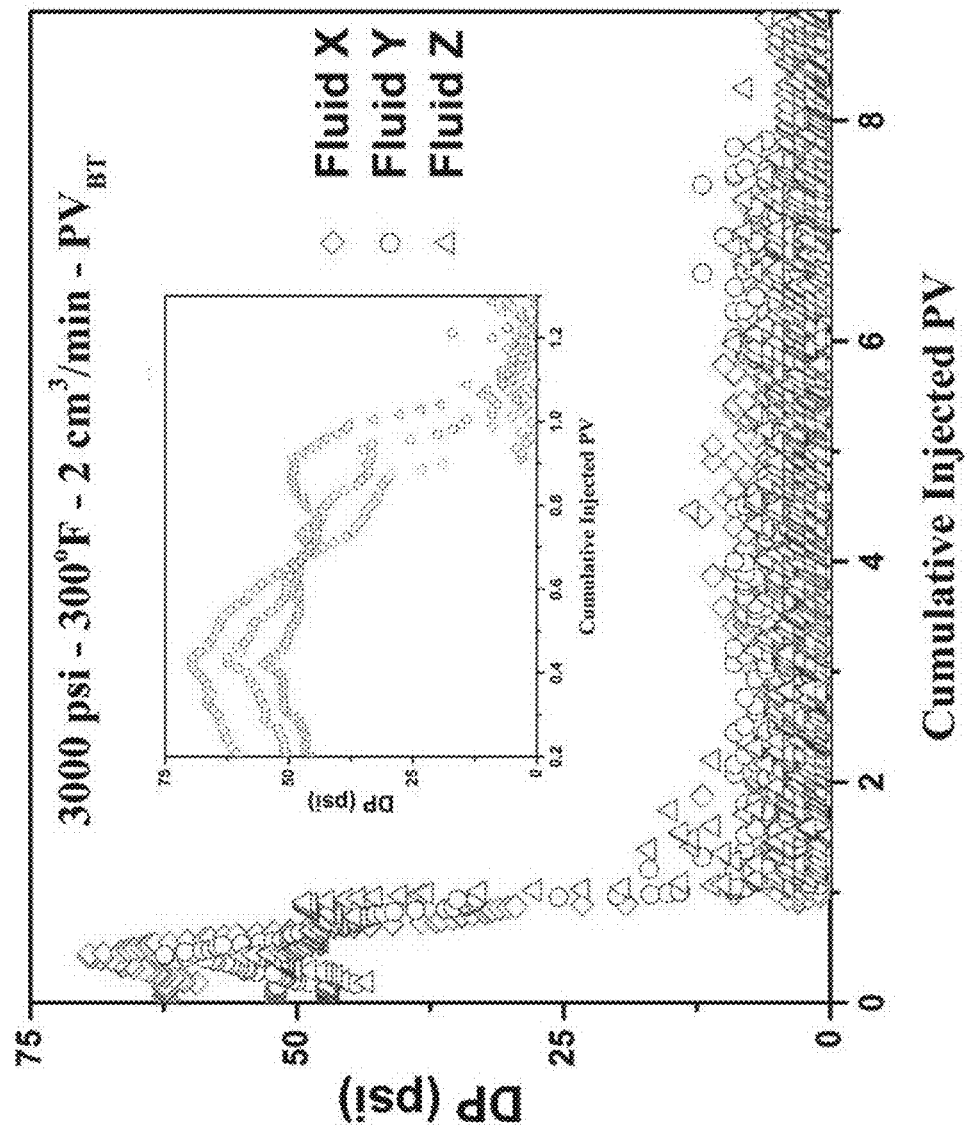
FIG. 8B is a color graphical representation of the coreflood data for Example 4 at an injection rate of 2 cc/min.
Figure 8C:
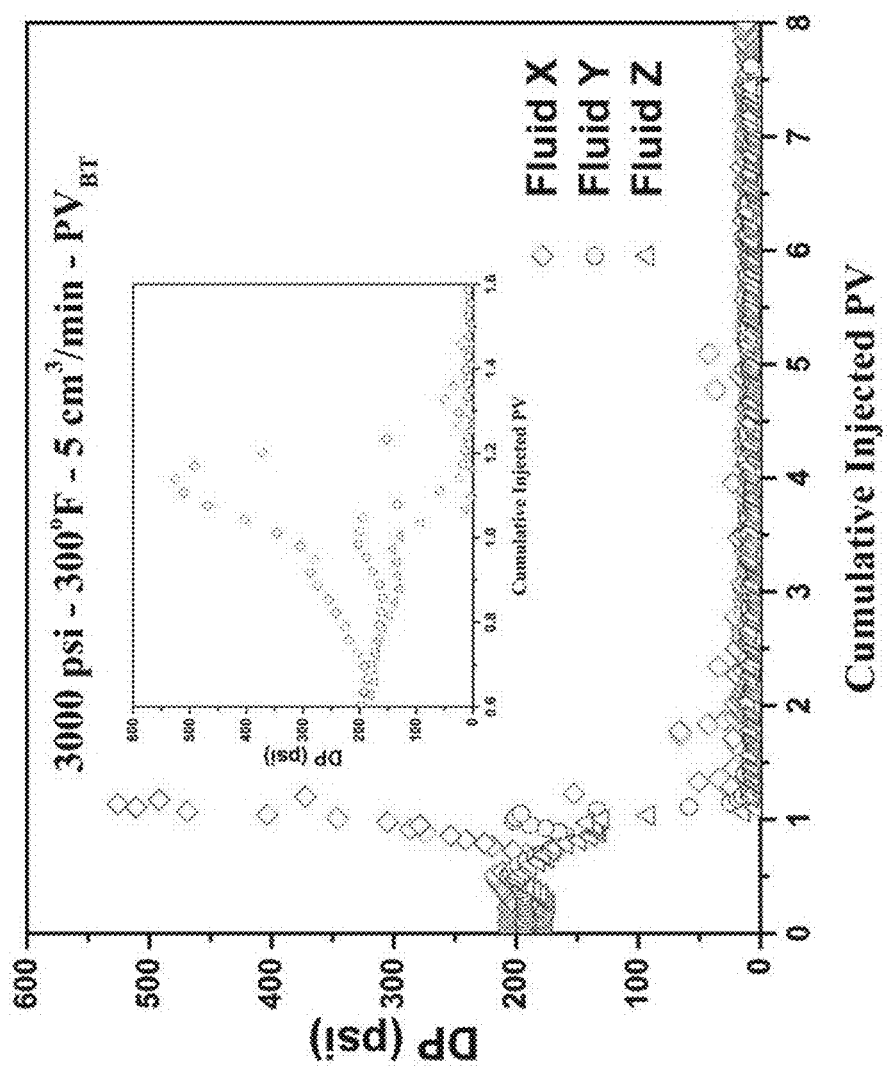
FIG. 8C is a color graphical representation of the coreflood data for Example 4 at an injection rate of 5 cc/min.
Figure 8D:
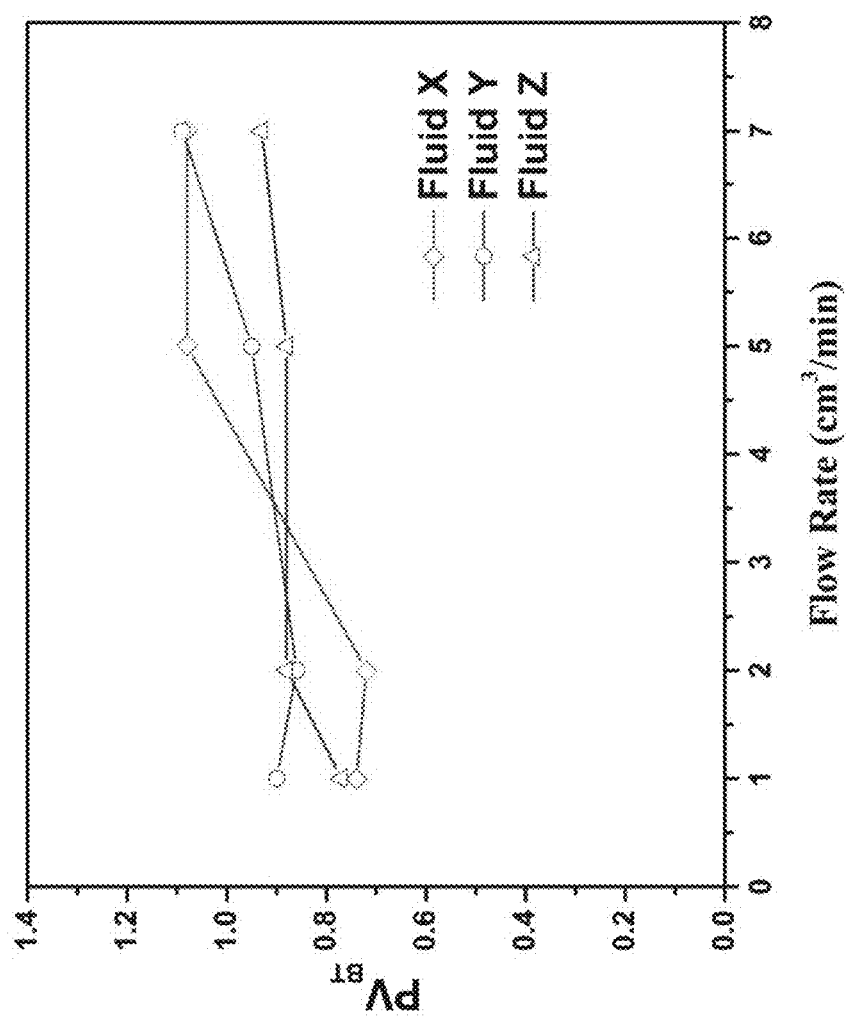
FIG. 8D is a color graphical representation of the relationship between the determined $PV_{BT}$ for each fluid as a function of injection rate for Example 4.

FIG. 7 is a plot of the results for Example 3 for injection of (i) 0.65 PV of fluid at 2 cc/min and (ii) a post-flush with 6 PV of deionized water. The 15h shut-in for Example 2 took place between (i) and (ii).

Example 4

In Example 4, further coreflood experiments were performed to compare the stabilized emulsified acids prepared according to the compositions of the present invention. Fluid Y and Fluid Z to a conventional emulsified acid, Fluid X, prepared as described above in Example 2. Specifically, a series of coreflood experiments was carried out at elevated temperatures and pressures to determine whether or not an optimum injection rate existed for the fluid systems of Example 4. As used herein, "optimum injection rate" refers to the flow rate at which breakthrough is achieved via the formation of dominant wormholes requiring the least volume of acid.

Each coreflood experiment in Example 4 was performed at 300° F. (148.9° C.) and 3000 psi (20,864 kPa). Flow rates of 1 cc/min, 2 cc/min, and 5 cc/min were tested to see if there was an optimum injection rate. The core was a 12″ Indiana Limestone core. Table 4 contains a summary of the data for Example 4, including core porosity and permeability, acid volume injected until breakthrough, and the amount of calcium carbonate dissolved.

TABLE 4

Summary of 12″ core data, coreflood experimental parameters and results measured at 300° F. and 3000 psi

| Fluid | Flow Rate (cc/min) | Permeability (mD)[a] | Core Porosity (%) | $PV_{BT}$[b] | CaCO$_3$ (g)[c] |
| --- | --- | --- | --- | --- | --- |
| X | 1.0 | 6.19 | 16.1 | 0.74 | 2.70 |
| Y | 1.0 | 6.59 | 16.1 | 0.90 | 1.05 |
| Z | 1.0 | 6.00 | 16.1 | 0.77 | 1.77 |
| X | 2.0 | 4.38 | 15.4 | 0.72 | 3.45 |
| Y | 2.0 | 5.59 | 15.8 | 0.86 | 3.78 |
| Z | 2.0 | 5.62 | 16.4 | 0.88 | 3.14 |
| X | 5.0 | 3.17 | 15.2 | 1.08 | 3.04 |
| Y | 5.0 | 3.41 | 15.1 | 0.95 | 4.92 |
| Z | 5.0 | 3.75 | 15.3 | 0.88 | 2.33 |

[a]Initial permeability
[b]$PV_{BT}$ represents the volume of fluid injected per pore volume of the core sample
[c]Amount of CaCO$_3$ (g) dissolved was determined from the calcium concentration detected in solution via ICP.

Figure 9:
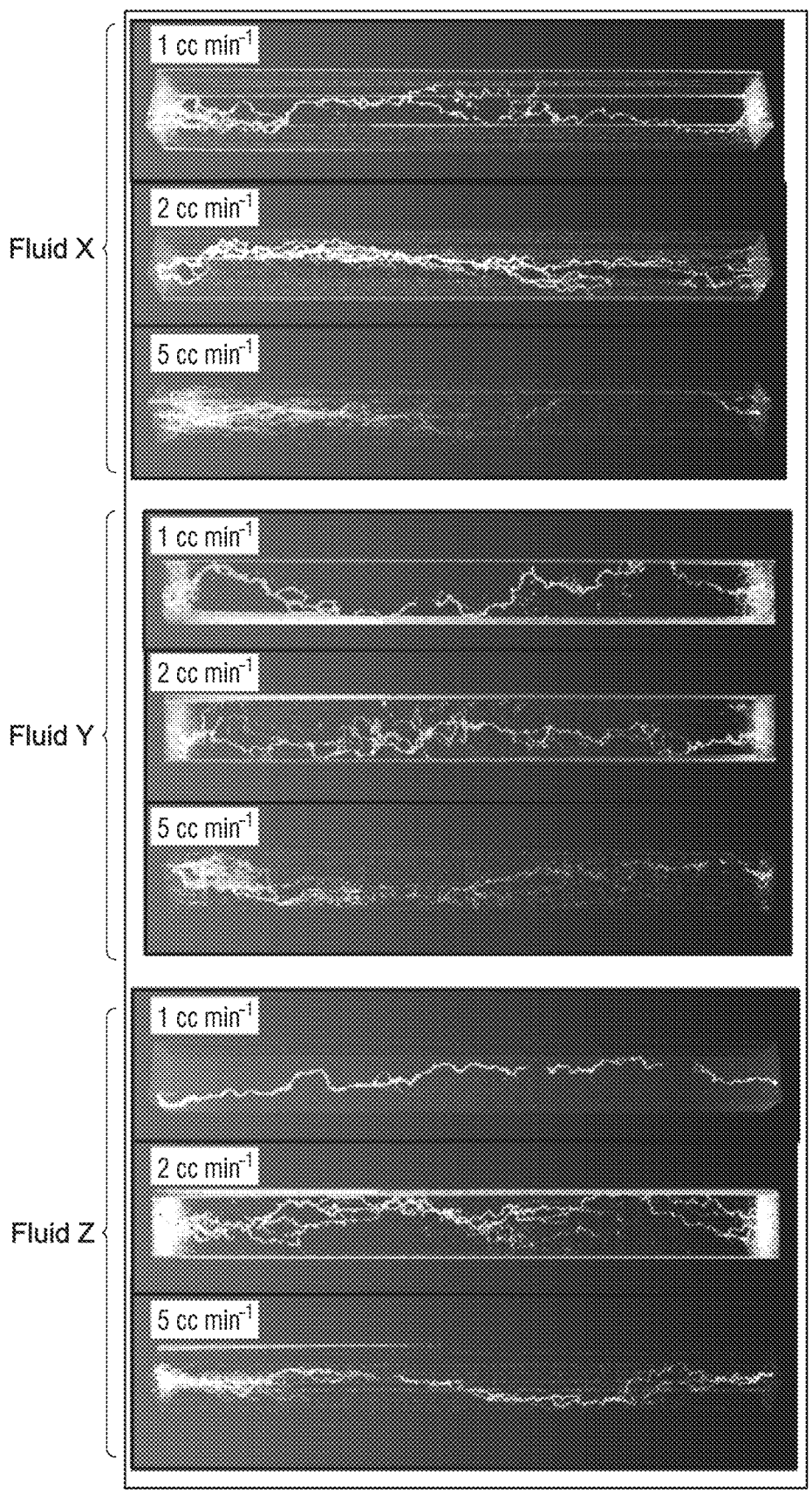
FIG. 9 is CT scan images for the acid treated core samples after the fluid injection until breakthrough for each of the injection flow rates of Example 4.

The pressure drop data measured continuously across each core sample at the flow rates in Table 4 is plotted in FIGS. 8A, 8B, 8C, and 8D. While FIGS. 8 A, 8B, 8C, and 8D do not reveal an optimum injection rate for Fluids Y and Z (FIG. 8D), the CT scans for the acid treated cores in FIG. 9 indicate that a rate of 1 cc/min or 2 cc/min is optimal based on a more localized and directional wormhole pattern revealed under these conditions. At higher injection rates, 5 cc/min, more face dissolution was observed in the inlet region of the core sample in the case of all fluids. Lower injection rates improved the fluid performance and permitted the acid to penetrate the core with a higher wormhole propagation rate. The results suggest that the use of stabilized emulsified acids, at lower flow rates, alleviates the need for large pumps and minimizes the chance of having large pressure drops during the acid injection stage.

Figure 10:
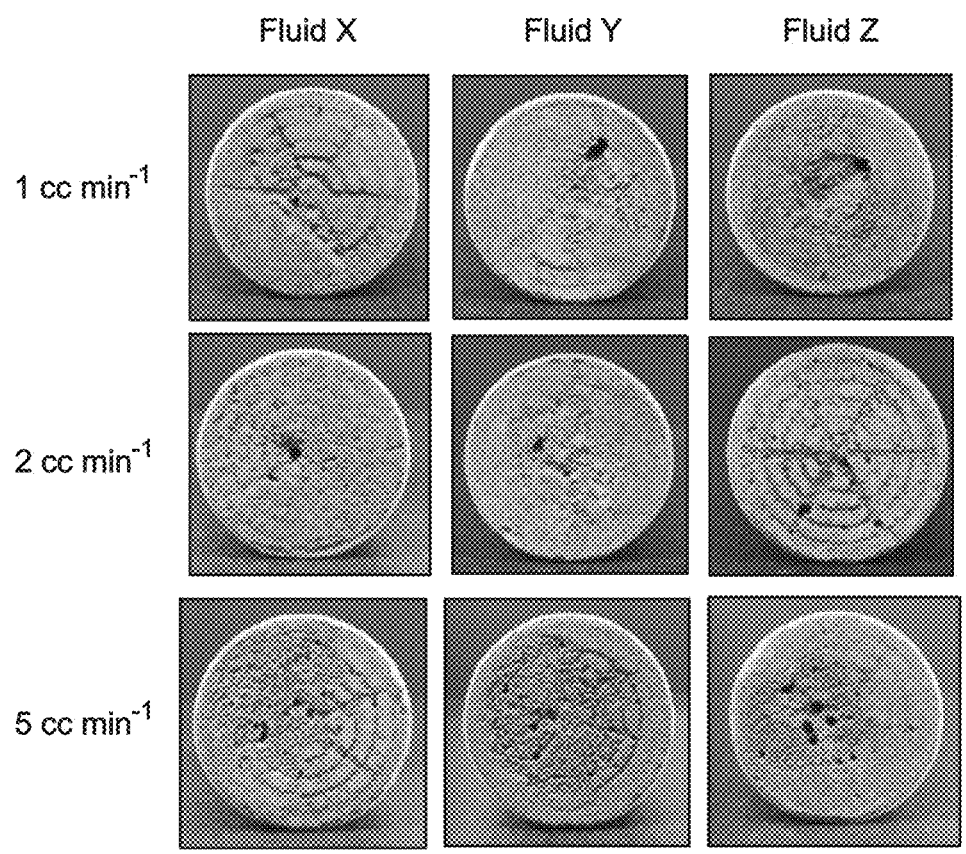
FIG. 10 is a pictorial representation of the inlet of each 12" core sample in Example 4.

FIG. 10 captures the appearance of the treated core sample, specifically the face (inlet). The effect of flow rate on the face dissolution is noted and follows a trend: that for all fluids a higher face dissolution was observed with increasing flow rate. At the shear stress, the stability of the emulsion is compromised for all fluids and leads to the pre-mature release of live acid at the inlet region.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed.

We claim:

1. A method of creating a wormhole extending into a deep carbonate formation, the method comprising the steps of:
introducing a stabilized emulsified acid with long-term thermal stability into a well that transverses a carbonate reservoir, the stabilized emulsified acid comprising:
a petroleum, the petroleum operable to provide a barrier between an acid and a reservoir rock;
the acid, the acid operable to react with the reservoir rock to dissolve the reservoir rock and produce the wormhole;
a functional framework, the functional framework operable to stabilize the stabilized emulsified acid, wherein the functional framework comprises a surface-modified clay material selected from an organoclay, wherein the organoclay is a functionalized montmorillonite-based organoclay containing 25 to 30 wt % methyl dihydroxyethyl hydrogenated tallow ammonium;
an emulsifier, the emulsifier operable to stabilize the stabilized emulsified acid; and
a corrosion inhibitor, the corrosion inhibitor operable to provide protection against corrosion for the metal components of a well;
allowing the stabilized emulsified acid to react with the carbonate reservoir, wherein the reaction between the stabilized emulsified acid dissolves the carbonate reservoir and produces the wormhole, wherein the stabilized emulsified acid is stable for a reaction time, such that in the reaction time the wormhole reaches the deep carbonate formation, wherein the deep carbonate formation is at a depth in a carbonate formation of between three inches and six feet from the well.

2. The method of claim 1, wherein the petroleum is diesel.

3. The method of claim 1, wherein the acid is hydrochloric acid.

4. The method of claim 1, wherein the stabilized emulsified acid further comprises at least one additional functional framework, wherein the at least one additional functional framework is selected from the group consisting of zeolites, hybrid organic-inorganic materials, and combinations thereof.

5. The method of claim 1 further comprising an emulsifier.

6. The method of claim 1, wherein the corrosion inhibitor is a cationic ammonium-based blend.

* * * * *